(12) United States Patent
Doherty et al.

(10) Patent No.: US 6,897,584 B2
(45) Date of Patent: May 24, 2005

(54) HIGH POWER TERMINAL BLOCK ASSEMBLY FOR GENERATORS AND METHOD OF ASSEMBLING AND INSTALLING THE SAME

(75) Inventors: Kieran P J Doherty, Oro Valley, AZ (US); William M. Scherzinger, Tucson, AZ (US); Gregor McDowall, Tucson, AZ (US); Lengel Jim, Oro Valley, AZ (US); Gerald E. Tornquist, Tucson, AZ (US); David B. Kane, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 238 days.

(21) Appl. No.: 10/132,439

(22) Filed: Apr. 25, 2002

(65) Prior Publication Data

US 2003/0203673 A1 Oct. 30, 2003

(51) Int. Cl.$^7$ ................................................ H02K 5/10
(52) U.S. Cl. .......................... 310/71; 310/89; 310/87; 439/709; 439/722; 439/564; 439/596; 411/389; 411/427
(58) Field of Search .............................. 310/71, 89, 87; 439/702, 722, 564, 596; 411/389, 427

(56) References Cited

U.S. PATENT DOCUMENTS

| | | | | |
|---|---|---|---|---|
| 2,412,259 A | * | 12/1946 | Graves, Jr. | .................. 403/256 |
| 2,487,328 A | | 11/1949 | George et al. | |
| 2,507,242 A | * | 5/1950 | Bost | .............. 439/49 |
| 2,531,719 A | | 11/1950 | Alvino | |
| 2,874,317 A | * | 2/1959 | Couse | ........................ 310/71 |
| 3,283,186 A | | 11/1966 | Perry | |
| 3,739,323 A | | 6/1973 | Spors | |
| 3,813,567 A | * | 5/1974 | Schmuck | ..................... 310/50 |
| 4,362,351 A | | 12/1982 | Wible | |
| 4,530,674 A | | 7/1985 | Rauch | |
| 4,683,390 A | * | 7/1987 | Imori et al. | .................... 310/71 |
| 4,712,029 A | * | 12/1987 | Nold | ........................... 310/71 |

(Continued)

FOREIGN PATENT DOCUMENTS

| | | | | |
|---|---|---|---|---|
| DE | 1119996 | * | 12/1961 | |
| DE | 4309899 A1 | * | 9/1993 | ............ H02K/5/22 |
| FR | 1 363 965 A | | 6/1964 | |
| GB | 1 031 3353 A | | 6/1966 | |
| JP | 58224536 A | * | 12/1983 | ............ H02K/5/22 |
| JP | 62071451 A | * | 4/1987 | ............ H02K/5/22 |
| JP | 05121110 A | * | 5/1993 | ............ H01R/9/18 |

OTHER PUBLICATIONS

The American Heritage College Dictionary, Houghton Mifflin Company, Third edition, p. 171.*

*Primary Examiner*—Darren Schuberg
*Assistant Examiner*—Yahveh Comas
(74) *Attorney, Agent, or Firm*—Douglas A. Mullen, Esq.

(57) ABSTRACT

A terminal block assembly for electrical generators, such as high speed AC generators used in aircraft, is made from components that are readily assembled and disassembled for ease of installation, maintenance, and repair. The terminal block assembly is formed of a terminal block and one or more terminal assemblies. The terminal block has a main body with at least an upper surface and a lower surface. A first cavity is formed in the main body lower surface, and an opening that extends through the main body between the upper surface and the first cavity. A threaded fastener is inserted into the opening and into the first cavity, and a bolt is coupled to the fastener to secure the fastener in the opening. Each terminal assembly is coupled to the terminal block and includes one or more electrically conductive terminal plates, feed-throughs, and slugs for connection to stator output leads, that are electrically and mechanically coupled together using electrically conductive fasteners.

15 Claims, 4 Drawing Sheets

U.S. PATENT DOCUMENTS

| | | | |
|---|---|---|---|
| 4,806,807 A | 2/1989 | Levino | |
| 4,894,575 A | 1/1990 | Nilsson et al. | |
| 4,895,470 A | 1/1990 | Scherzinger | |
| 4,942,944 A | 7/1990 | Frey et al. | |
| 4,943,746 A | 7/1990 | Scherzinger et al. | |
| 4,959,572 A | 9/1990 | Becker | |
| 5,012,146 A | 4/1991 | Tumpey | |
| 5,013,948 A | 5/1991 | Tumpey et al. | |
| 5,063,314 A | 11/1991 | DeSantis | |
| 5,122,696 A | 6/1992 | Shih et al. | |
| 5,191,254 A | 3/1993 | Raad et al. | |
| 5,196,752 A | 3/1993 | Palma | |
| 5,264,816 A | 11/1993 | Degenhart et al. | |
| 5,332,939 A | 7/1994 | Fanning et al. | |
| 5,382,856 A | 1/1995 | Keck et al. | |
| 5,500,563 A | 3/1996 | Kawaguchi et al. | |
| 5,698,923 A | 12/1997 | Scherzinger et al. | |
| 5,989,073 A * | 11/1999 | Kahoun | 439/709 |
| 6,081,056 A * | 6/2000 | Takagi et al. | 310/89 |
| 6,100,809 A | 8/2000 | Novoselsky et al. | |
| 6,113,024 A | 9/2000 | Pittard et al. | |
| 6,121,709 A | 9/2000 | Fathimulla et al. | |
| 6,122,817 A | 9/2000 | Meacham et al. | |
| 6,124,655 A | 9/2000 | Jeske | |
| 6,225,718 B1 | 5/2001 | Kamei et al. | |
| 6,278,206 B1 | 8/2001 | Yockey et al. | |
| 6,280,265 B1 * | 8/2001 | Hopeck et al. | 439/843 |
| 6,300,698 B1 | 10/2001 | Fargo et al. | |
| 6,664,678 B2 * | 12/2003 | Shimizu | 310/71 |

* cited by examiner

HIGH POWER TERMINAL BLOCK ASSEMBLY FOR GENERATORS AND METHOD OF ASSEMBLING AND INSTALLING THE SAME

FIELD OF THE INVENTION

The present invention relates to rotating electrical machines such as high speed generators and, more particularly, to a terminal assembly used to transmit electrical energy between the electrical machine and external systems and equipment, and a method of assembling and installing the terminal assembly in the machine.

BACKGROUND OF THE INVENTION

A generator system for an aircraft may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator, and this three-phase AC output can then be provided to a load such as, for example, an aircraft electrical system.

The AC output from the generator may be supplied from stator output leads, via one or more terminal assemblies. The terminal assemblies may consist of feed-throughs that extend through the generator housing, and are coupled to the stator output leads within the generator housing and to a terminal block assembly outside of the generator housing. Insulators and seals may be used with the feed-throughs to electrically insulate the feed-throughs from the housing and to provide a sufficiently leak-tight seal around the feed-throughs, respectively.

In some cases, the feed-throughs are coupled to the stator output leads and the terminal block assembly by a relatively high temperature brazing process. During this process, the insulators and seals may be protected with one or more heat sinks to reduce the likelihood of component degradation and/or failure from exposure to the heat. Thus, some feed-throughs are relatively large in size in order to allow an effective connection to a heat sink during the brazing process. Even with heat sinks installed during the brazing process, the insulators and seals are still damaged in some instances. Moreover, after the feed-throughs are installed, various testing may still have to be performed to verify proper electrical and mechanical performance, which can increase costs. In addition, repairing feed-throughs installed in this manner can be time consuming and complex, increasing repair costs.

Hence, there is a need for a terminal assembly that addresses one or more of the above-noted drawbacks. Namely, a terminal assembly and installation method that does not result in significant component damage or failure during installation, and/or does not require significant amounts of verification testing after installation, and/or allows for comparatively easy and less time consuming repairs, and is therefore less costly as compared to present assemblies. The present invention addresses one or more of these needs.

SUMMARY OF THE INVENTION

The present invention provides a terminal assembly for electrical machines, such as high speed AC generators, that is relatively simple in design, is relatively inexpensive, and is relatively easy to install.

In one embodiment of the present invention, and by way of example only, a terminal assembly for electrically connecting generator stator output leads to external systems and equipment includes an electrically conductive terminal plate, an electrically conductive feed-through, first and second electrically conductive fasteners, and a slug. The terminal plate is adapted for mounting to an external portion of a generator housing. The electrically conductive feed-through is adapted to pass through an opening formed in the generator housing and has a first end and a second end. The first electrically conductive fastener couples the feed-through first end to the terminal plate. The slug is adapted to join to at least one of the stator output leads. The second electrically conductive fastener couples the slug to the feed-through second end.

Other independent features and advantages of the preferred terminal assembly will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the present invention is not limited to use in conjunction with a specific type of generator. Thus, although the present invention is, for convenience of explanation, depicted and described as being implemented in a brushless AC (alternating current) generator, it will be appreciated that it can be implemented in other AC generator designs needed in specific applications, and other electrical machines, such as various AC motors, DC generators, and DC motors.

Figure 1:
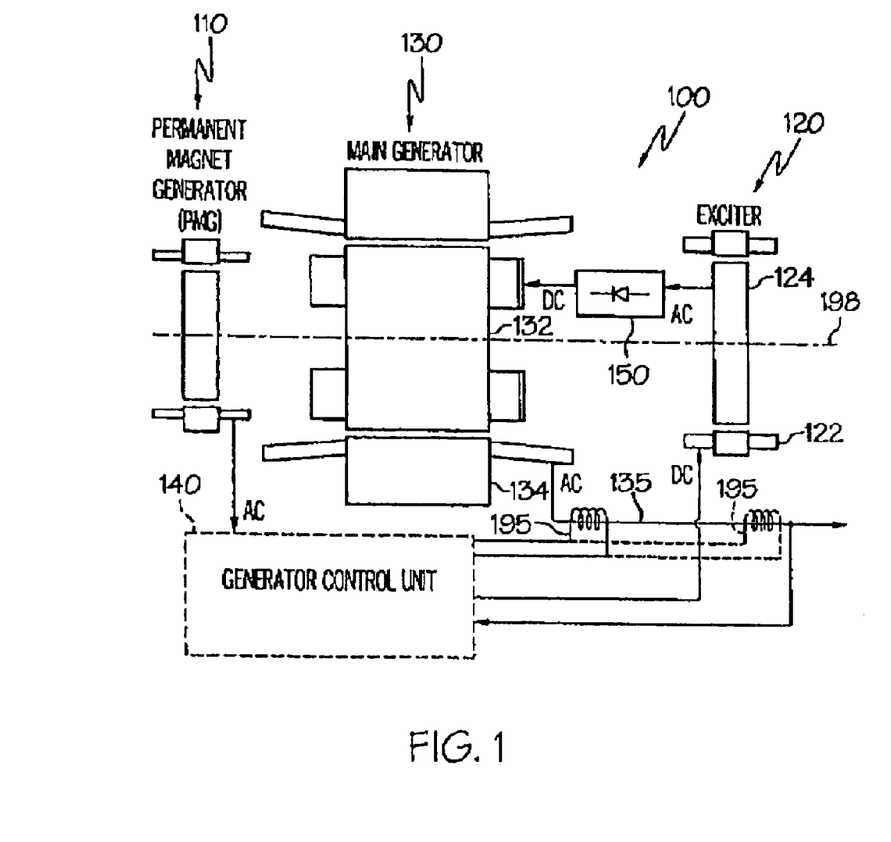
FIG. 1 is a functional schematic block diagram of an exemplary high speed generator system according to an embodiment of the invention.

Turning now to the description, and with reference first to FIG. 1, a functional schematic block diagram of an exemplary high speed generator system 100 for aircraft, and which may include an embodiment of the present invention, is depicted. This exemplary generator system 100, which is commonly known as a brushless AC generator, includes a permanent magnet generator (PMG) 110, an exciter 120, a main generator 130, a generator control unit 140, and one or more a rectifier assemblies 150. During operation, the PMG 110, exciter 120, and portions of the main generator 130 all rotate. As the PMG 110 rotates, it generates and supplies AC power to a generator control unit 140, which in turn supplies direct current (DC) power to a stator 122 of the exciter 120. A rotor 124 of the exciter 120 in turn supplies AC power to the rectifier assemblies 150. The output from the rectifier assemblies 150 is DC power and is supplied to a main generator rotor 132, which in turn outputs AC power from a main generator stator 134.

The generator system 100 is capable of providing output power at a variety of frequencies and over a variety of frequency ranges. The output power from the main generator stator 134 is typically three-phase AC power. One or more stator output leads 135 supplies the generated AC power to external systems and equipment via one or more terminal assemblies 137 (see FIG. 3 ), which are discussed in more detail below. The generator control unit 140 can regulate the power output based upon monitoring signals provided to it from monitoring devices 195. In the depicted embodiment, the PMG 110, the exciter 120, and the main generator 130 all rotate along a single axis 198 at the same rotational speed. It will be appreciated, however, that in other embodiments the PMG 110 may rotate along a different axis. Moreover, the relative positioning of the PMG 110, the exciter 120, and the main generator 130 can be modified in different embodiments such that the exciter 120 is physically between the PMG 110 and the main generator 130.

Figure 2:
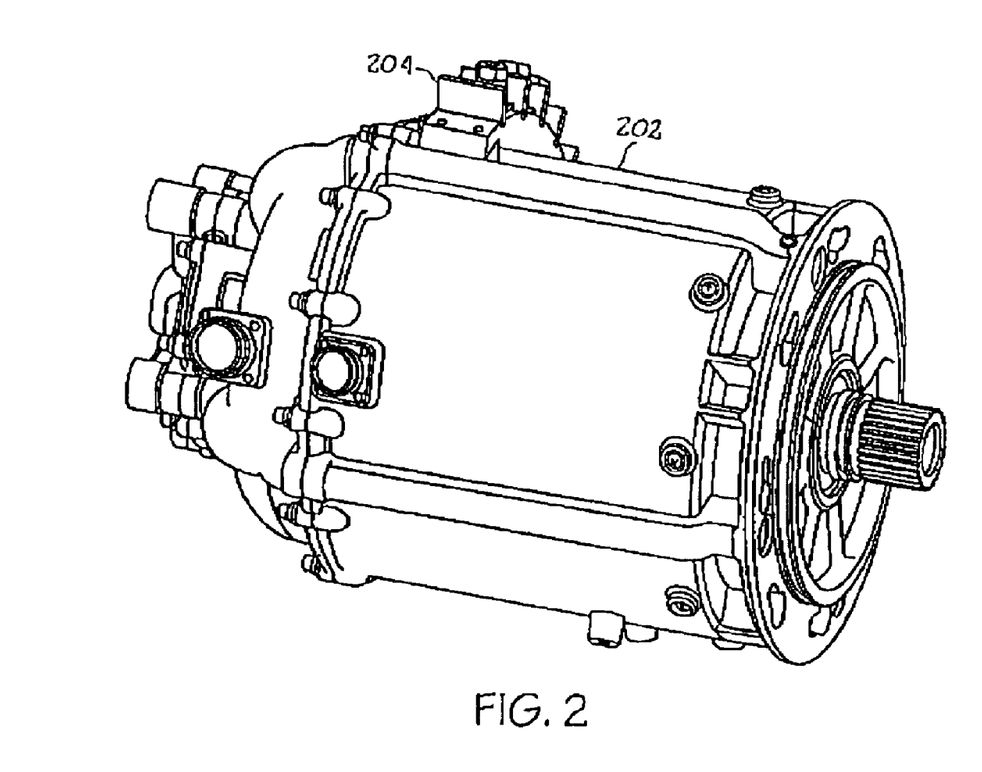
FIG. 2 is a perspective view of a physical embodiment of the generator system depicted in FIG. 1.

The generator system 100, or at least portions of the system 100, may be housed within a generator housing 202, a perspective view of which is illustrated in FIG. 2. A terminal block 204 is mounted to the generator housing 202, and provides the electrical interface to external equipment and systems. As shown more clearly in FIGS. 3 and 4, the terminal block 204 includes a plurality of terminal sections 301a–d, each of which includes a main body 303 having an upper surface 305 and a lower surface 307, and a plurality of threaded mounting studs 302 to which a plurality of the terminal assemblies 137 are mounted. Each terminal section 301a–d includes a first cavity 402 that is formed in the main body lower surface 307, a second cavity 404 that is formed in the main body upper surface 305, and an opening 406 that extends through the terminal block 204 between the first 402 and second 404 cavities. Each mounting stud 302 is mounted to the terminal block 204 via the opening 406. More particularly, as shown more clearly in FIG. 4, each second cavity 404 is formed such that its inner perimeter 408 has a predetermined shape, such as, for example, a square. The mounting studs 302 each include a mating section 410 having an outer perimeter that is shaped substantially similar to, and mates with, the inner perimeter 408 of the second cavity 404. This configuration relieves a substantial amount of the torque that is exerted when the terminal assemblies 137 are mounted to the terminal block 204. The mounting studs 302 are secured to the terminal block 204 using a first nut 411. The first nut 411 may be tightened onto the mounting stud 302 via the first cavity 402. Once the first nut 411 is sufficiently tightened onto the mounting stud 302, the first cavity 402 may be filled with a suitable material, such as a dielectric epoxy.

The terminal assemblies 137 are mounted, one each, to the terminal block 204 and each includes a terminal plate 304, a feed-through 306, a slug 308 an insulator assembly 310, and one or more seals 312a, b. Each terminal plate 304 is formed from an electrically conductive material such as, for example, copper, and is coupled to the terminal block 204 via one of the mounting studs 302 and second nut 314 that is threaded onto the mounting stud 302. The terminal plate 304 preferably includes a slot 316, which allows the terminal plate 302 to be slid around the mounting stud 302. The second nut 314 may then be tightened around the stud 302 to hold the terminal plate 304 in place. It will be appreciated that the terminal plate 304 could include a through-hole rather than the slot 316. In such an instance the terminal plate 304 could be slid down around the mounting stud 302, via the through-hole. As FIG. 3 further depicts, an alignment clip 318 may additionally be placed between the terminal plate 304 and the generator housing 202. The alignment clip 318 helps maintain proper alignment of the terminal plate 304.

Figure 3:
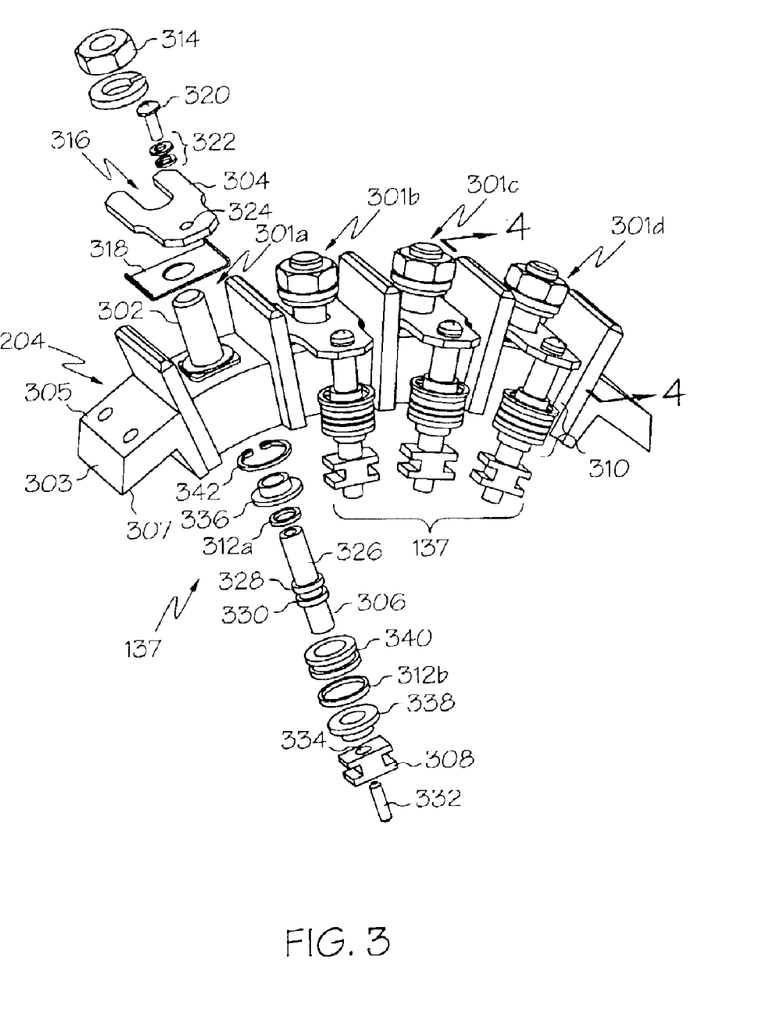
FIG. 3 is a perspective cross-section view of a terminal block and attached terminal assemblies that may be used with the generator depicted in FIG. 2, with one terminal assembly depicted in an exploded view.

The feed-throughs 306 each extend from the terminal block 204 and are inserted through the generator housing 202. In the depicted embodiment, the feed-through 304 is coupled to the terminal plate 302 using fastener hardware, such as a threaded screw 320, that is inserted through washers 322 and an opening 324 formed in the terminal plate 304. As shown more clearly in FIG. 4, to facilitate this coupling method the feed-through 306 includes a first annular bore 412 that extends from a first end 414 of the feed-through 306 a first predetermined distance into the feed-through 306 and forms a first inner circumferential surface. Threads 416 are formed on the first inner circumferential surface to mate with like threads on the screw 320. each feed-through 306 additionally includes a second annular bore 418. The second annular bore 418 extends from a second end 420 of the feed-through 306 a second predetermined distance into the feed-through 306 and forms a second inner circumferential surface. Similar to the first inner circumferential surface, the second inner circumferential surface also has threads 422 formed thereon. It will be appreciated that the feed-through 306 could also be configured to include a single annular bore that extends between the first 414 and second 420 ends of the feed-through 306. The feed-throughs 306 preferably have an outer surface 326 that is substantially cylindrical in shape, and may also include two protruding rings 328, 330 formed on the outer surface 326. The feed-throughs 306, like the terminal plates 304, are also preferably formed from an electrically conductive material such as, for example, copper. It will be appreciated that the feed-throughs 306 may be formed in other shapes as desired to meet varying design configurations.

The slugs 308 are coupled one each to the second ends 420 of each feed-through 306. Preferably, this is done using a fastener such as, for example, a threaded grub screw 332 that mates with the threads 424 formed on the feed-through second inner circumferential surface. To accommodate the grub screw 332, an opening 334 is formed through each of the slugs 308. The opening 334 in each slug 308 may be threaded or, in the depicted embodiment, includes a helicoil insert 426 (see FIG. 4). Moreover, although the slugs 308 in the depicted embodiment have an I-shaped cross-section, it will be appreciated that this shape is merely exemplary of a particular preferred embodiment, and that the slugs 308 may be formed into other cross-sectional shapes. The I-shaped cross-section is preferred if the main generator stator 134 is configured as a double-wound stator, since this allows two stator windings to be brazed on each side of the slug 308.

As noted above, the feed-throughs 306 extend from the terminal block 204 and are inserted through the generator housing 202. As shown more particularly in FIG. 4, the feed-throughs. 306 extend through a substantially smooth bore 428 formed in the generator housing 202, and are electrically insulated from the generator housing 202 by the insulator assemblies 310. The insulator assemblies 310 each surround one of the feed-throughs 306 and, in addition to electrically insulating the feed-throughs 306, provide lateral support for the feed-throughs 306 in the bore 428. In the depicted embodiment, the insulator assembly 310 is made up of three separate insulators, an upper insulator 336, a lower insulator 338, and an intermediate insulator 340. the intermediate insulator 340 surrounds the protruding rings 328, 330, and a first seal 312a is positioned between the protruding rings 328, 330 and the intermediate insulator 340 to provide a substantially leak-tight seal therebetween. A second seal 312b surrounds the intermediate insulator 340 and provides a substantially leak-tight seal between the insulator assembly 310 and the generator housing bore 428. The lower insulator 338 is positioned below the intermediate insulator 340 and rests on a ledge 430 formed in the bore 428 adjacent the inside of the generator housing 202. The upper insulator 336 is positioned above the intermediate insulator 340.

Figure 4:
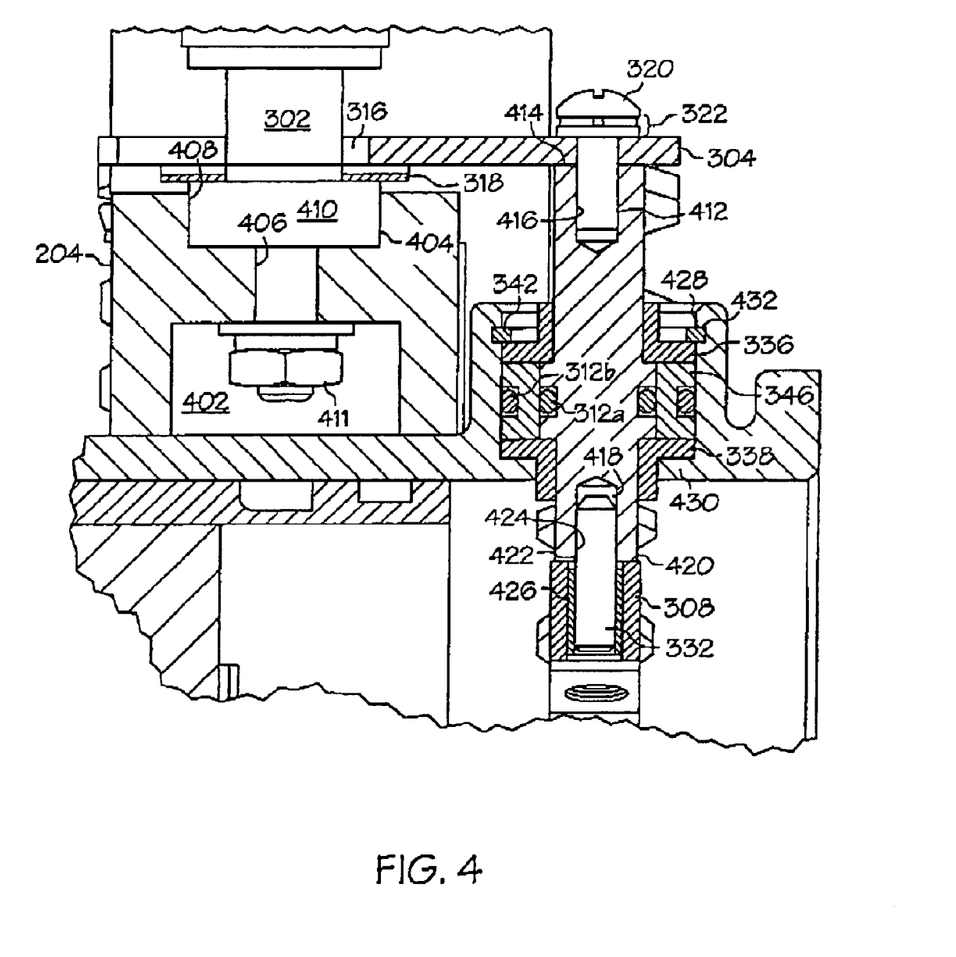
FIG. 4 is a cross-section view of the terminal block and terminal assembly taken along line 4—4 in FIG. 3.

A groove 432 is formed in the bore above the upper insulator 336, and is dimensioned to receive a spring clip 342 that is inserted into the bore 428. The spring clip 342 contacts the upper insulator 336 and secures the insulator assembly 310 within bore 428. It will be appreciated that the insulator assembly 310 is not limited to construction of multiple pieces, but could be constructed of a single piece. It will additionally be appreciated that other configurations could be used to secure the insulator assembly 310 in the bore 428. For example, the bore 428 and insulator assembly 310 could each include threads and be threaded together, a separate threaded fastener could be used, or an adhesive or epoxy could be used.

Having described the terminal assembly 137 from a structural standpoint, a preferred method of installing a single terminal assembly 137 into a generator 100 will now be described. It will be appreciated that the described method need not be performed in the order in which it is described herein, but that this description is merely exemplary of one method of installing a terminal assembly 137. A slug 308 is properly positioned in the generator housing 202 and the proper stator output leads 135 are coupled to the slug 308 by, for example, a brazing process. A positioning tool may be used during the brazing process to assure proper positioning of the slug 308 during and after the brazing process. Then, a feed-through 306, with an insulator assembly 310 and seals 312a, 312b in place, is inserted through the bore 428 in the generator housing 202. A grub screw 332 is then threaded through the opening 334 in the slug 308 and into the second annular bore 422 in the feed-through 306, mechanically and electrically coupling them together. A spring clip 342 is then installed into the bore 428 and positioned within the groove 432. A terminal plate 304 is then positioned around the appropriate mounting stud 302, and a first bolt 314 and other associated mounting hardware is then tightened around the mounting stud 302. A screw 320 is then inserted through the opening 324 in the terminal plate 304 and is threaded into the feed-through first annular bore 412 to mechanically and electrically couple the terminal plate 304 and feed-through 306 together.

If the generator 100 into which the terminal assembly 137 is being installed does not have the terminal block 204 disclosed herein, the generator may be modified to include the terminal block 204.

The terminal assembly 137 is relatively easy to install and does not expose heat sensitive components to the high temperature brazing process, since the heat sensitive components are joined to the slug 308 after the brazing process. Thus, it is relatively reliable and less costly to install as compared to other terminal assemblies. The terminal assembly 137 also allows for relatively quick, easy, and inexpensive repairs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A terminal assembly for electrically connecting generator stator output leads to external systems and equipment, comprising:
    an electrically conductive terminal plate adapted for mounting to an external portion of a generator housing, the terminal plate having an opening formed therein;
    an electrically conductive feed-through adapted to pass through an opening formed in the generator housing, the feed-through having a first end end and a second end, the feed-through first and second ends having a first and second opening, respectively, formed therein and a first and second annular bore extending from the respective first and second openings a distance into the feed-through to form a first and a second inner circumferential surface, respectively, the first and second inner circumferential surfaces each having threads formed on at least a portion thereof;
    a first electrically conductive fastener having threads on at least a portion thereof, the first fastener extending through the terminal plate opening and into the first annular bore, the threads on the first fastener engaging the threads on the first inner circumferential surface to thereby couple the feed-through first end to the terminal plate;
    a slug adapted to join to at least one of the stator output leads, the slug having an opening formed therein; and
    a second electrically conductive fastener having threads on at least a portion thereof the second fastener extending through the slug opening and into the second annular bore, the threads on the second fastener engaging the threads on the second inner circumferential surface to thereby couple the slug to the feed-through second end.

2. The terminal assembly of claim 1, further comprising:
    a first insulator surrounding at least a portion of the conductive feed-through for electrically insulating the feed-through from the generator housing.

3. The terminal assembly of claim 2, further comprising:
    a first seal surrounding the first insulator for providing a substantially leak-tight seal between the first insulator and the generator housing.

4. The terminal assembly of claim 3, further comprising:
    a second seal positioned between the first insulator and the conductive feed-through for providing a substantially leak-tight seal therebetween.

5. The terminal assembly of claim 1, wherein the slug has a substantially I-shaped cross section.

6. The terminal assembly of claim 1, further comprising:
    an insulator assembly surrounding at least a portion of the conductive feed-through for electrically insulating the feed-through from the generator housing; and
    a spring clip having a first portion thereof positioned in a groove formed in the generator housing and a second portion thereof in contact with the insulator assembly.

7. The terminal assembly of claim 1, wherein the slug is joined to the stator output lead by a brazing process.

8. A terminal block assembly adapted for mounting to an external portion of a generator housing and for electrically connecting generator stator output leads to external systems and equipment comprising:
a main body having at least an upper surface and a lower surface;
a first cavity formed in the main body lower surface;
an opening extending through the main body between the upper surface and the first cavity;
a threaded fastener having a first end and a second end, the fastener second end extending through the opening and into the first cavity;
a first bolt coupled to the fastener second end to secure the fastener in the opening;
an electrically conductive terminal plate mounted to the main body upper surface, the terminal plate having an opening formed therein;
an electrically conductive feed-through adapted to pass through an opening formed in the generator housing, the feed-through having a first end and a second end, the feed-through first and second ends having a first and second opening, respectively, formed therein and a first and second annular bore extending from the respective first and second openings a distance into the feed-through to form a first and a a second inner circumferential surface, respectively, the first and second inner circumferential surfaces each having threads formed on at least a portion thereof;
a first electrically conductive fastener having threads on at least a portion thereof, the first fastener extending through the terminal plate opening and into the first annular bore, the threads on the first fastener engaging the threads on the first inner circumferential surface to thereby couple the feed-through first end to the terminal plate;
a slug adapted to join to at least one of the stator output lead, the slug having an opening formed therein; and
a second electrically conductive fastener having threads on at least a portion thereof, the second fastener extending through the slug opening and into the second annular bore, the threads on the second fastener engaging the threads on the second inner circumferential surface to thereby couple the slug to the feed-through second end.

9. The terminal assembly of claim 8, further comprising:
a first insulator surrounding at least a portion of the conductive feed-through for electrically insulating the feed-through from the generator housing.

10. The terminal assembly of claim 9, further comprising:
a first seal surrounding the first insulator for providing a substantially leak-tight seal between the first insulator and the generator housing.

11. The terminal assembly of claim 10, further comprising:
a second seal positioned between the first insulator and the conductive feed-through for providing a substantially leak-tight seal therebetween.

12. The terminal assembly of claim 8, wherein the slug has a substantially I-shaped cross section.

13. The terminal assembly of claim 8, further comprising.
an insulator assembly surrounding at least a portion of the conductive feed-through for electrically insulating the feed-through from the generator housing; and
a spring clip having a first portion thereof positioned in a groove formed in the generator housing and a second portion thereof in contact with the insulator assembly.

14. The terminal block of claim 8, further comprising:
a second cavity formed in the main body upper surface, the second cavity having an inner perimeter formed into a predetermined shape; and
a mating section formed on an intermediate portion of the threaded fastener, the mating section having an outer perimeter formed substantially similar to the predetermined shape,
wherein the mating section is at least partially inserted into, and mates with, the second cavity.

15. A generator, comprising:
a housing;
a stator mounted within the housing;
a rotor rotationally mounted within the stator; and
a terminal block assembly mounted to an external surface of the housing, the terminal block assembly including:
a main body having at least an upper surface and a lower surface;
a first cavity formed in the main body lower surface,
an opening extending through the main body between the upper surface and the first cavity,
a threaded fastener having a first end and a second end, the fastener second end extending through the opening and into the first cavity,
a first bolt coupled to the fastener second end to secure the fastener in the opening,
an electrically conductive terminal plate mounted to the main body upper surface, the terminal plate having an opening formed therein;
an electrically conductive feed-through adapted to pass through an opening formed in the generator housing, the feed-through having a first end and a second end, the feed-through first and second ends having a first and second opening, respectively, formed therein sod a first and second annular bore extending from the respective first and second openings a distance into the feed-through to form a first and a second inner circumferential surface, respectively, the first and second inner circumferential surfaces each having threads formed on at least a portion thereof;
a first electrically conductive fastener having threads on at least a portion thereof, the first fastener extending through the terminal plate opening and into the first annular bore, the threads on the first fastener engaging the threads on the first inner circumferential surface to thereby couple the feed-through first end to the terminal plate;
a slug adapted to join to at least one of the stator output leads, the slug having an opening formed therein; and
a second electrically conductive fastener having threads on at least a portion thereof, the second fastener extending through the slug opening and into the second annular bore, the threads on the second fastener engaging the threads on the second inner circumferential surface to thereby couple the slug to the feed-through second end.

* * * * *

UNITED STATES PATENT AND TRADEMARK OFFICE
CERTIFICATE OF CORRECTION

PATENT NO. : 6,897,584 B2
DATED : May 24, 2005
INVENTOR(S) : Kieran PJ Doherty et al.

It is certified that error appears in the above-identified patent and that said Letters Patent is hereby corrected as shown below:

Column 4,
Line 20, change "each" to -- Each --.
Line 58, change "the feed-througs.306" to -- the feed-throughs 306 --.

Column 8,
Line 41, change "sod" to "and".

Signed and Sealed this

Eleventh Day of October, 2005

JON W. DUDAS
*Director of the United States Patent and Trademark Office*